United States Patent

[11] 3,595,106

[72] Inventors Piero Pomella;
Luciano Lauro, both of Ivrea, Turin, Italy
[21] Appl. No. 760,012
[22] Filed Sept. 16, 1968
[45] Patented July 27, 1971
[73] Assignee Ing C. Olivett & C., S.p.A.
Ivrea, Turin, Italy
[32] Priority Sept. 16, 1967
[33] Italy
[31] 53044-A/67

[54] DIGITAL POSITION CONTROL DEVICE FOR APPARATUS SUCH AS MACHINE-TOOLS HAVING A ROTATABLE MEMBER
6 Claims, 3 Drawing Figs.

[52] U.S. Cl...................................................... 82/1,
82/5, 10/101, 10/105

[51] Int. Cl...................................................... B23b 3/00,
B23b 1/00
[50] Field of Search........................................ 82/5;
10/101, 105; 235/151.11

[56] References Cited
UNITED STATES PATENTS
3,174,367 3/1965 Luckens....................... 82/5
3,381,557 5/1968 Dunn........................... 82/5

*Primary Examiner*—Harrison L. Hinson
*Attorney*—Birch, Swindler, McKie & Beckett ABSTRACT: A numerical control device for machine-tool operation in which a tool or workpiece, or both, must be both translated linearly and rotated. The two motions are correlated as necessary, for instance, to cut a screw thread.

3,595,106

DIGITAL POSITION CONTROL DEVICE FOR APPARATUS SUCH AS MACHINE-TOOLS HAVING A ROTATABLE MEMBER

GENERAL DESCRIPTION

The present invention relates to a digital control device for positioning a movable member of a machine-tool or a similar equipment provided with a rotary axis, comprising an interpolating unit.

The interpolating unit whereto reference is made is the one described in our patent application Ser. No. 575,802, filed Aug. 19, 1966, now U.S. Pat. No. 3,518,513.

According to the said parent application the digital control device for continuously positioning, along one or more axes, a movable member of a machine-tool or a similar equipment, fed by a program unit operable to supply discontinuous position orders, comprises an interpolating unit operating by means of the accumulation of position increments in successive interpolation cycles, said unit feeding for each of said axes a distinct servosystem operable to execute said positioning operation, and the amount of the increment accumulated in each interpolation cycle being variable in order to control the speed and the acceleration of said movable member along its path.

Said device operates as a computer for computing in a continuous way the points of a path approximated by means of a broken line made up of any number of rectilinear segments. This computer therefore defines an interpolation unit which, fed by a discrete number of geometrical and technological data recorded for instance on a perforated paper tape, supplies continuously the data for the positions related to all intermediate points comprised along the path which connects all discrete points of the program.

The device described in the above-mentioned patent application is operable to control also very complex mechanisms, which require the simultaneous and coordinate movement of the movable member of the machine along a plurality of axes, while the necessary programming is simple, since it is necessary to program only the coordinates of the successive discrete points along the path and a predetermined value corresponding to the highest moving speed admitted along each rectilinear segment connecting two subsequent discrete points.

In the device according to the above-mentioned patent application the interpolating unit is provided with a cyclic memory comprising a plurality of recirculating registers, the duration of the cycle of said memory being a submultiple of the duration of each interpolation cycle, whereby each interpolation cycle comprises at least two memory cycles, in the first of which logical operations of comparison are executed for deciding the acceleration changes, while in the second memory cycle upon the results of said comparison operations the computation of the position increment related to said interpolation cycle is carried out.

The present invention permits the use of the device according to the above-mentioned patent application for the control of a machine-tool or a similar equipment provided with a rotary axis, as for instance a lathe. Therefore the device according to the present invention allows the control of the positioning of the movable member of said machine along two or more axes, one of which is a rotary one.

More particularly, the device according to the invention is able to control continuously the digital position of a movable member of a machine along one or more linear axes and a rotary axis and is fed by a program unit adapted to supply discontinuous position orders. The device comprises an interpolating unit operating by means of the accumulation of position increments in successive interpolation cycles, said unit feeding for each of said linear axes a distinct servosystem able to carry out said positioning operation. The device is characterized in that said discontinuous position orders comprise the extreme coordinates of the path segments to be travelled along said linear axes, the displacement increments along said linear axes for each revolution of the movable member around said rotary axis, and the rotation speed of said movable member around said rotary axis, and in that the increment accumulated by said interpolating unit for each of the displacement axes during a single revolution of said movable member is equal to the corresponding programmed displacement increments.

DETAILED DESCRIPTION

This and other characteristics of the invention will become apparent from the following description of a preferred embodiment made by way of example and not in a limiting sense, with reference to the accompanying drawings wherein.

The device according to the invention may be used as a position control device for lathes, for instance for the production or the inspection of threads. Therefore, the description that follows will be made in connection with this particular embodiment of the device according to the invention.

X and Y are assumed to indicate the linear displacement axes of the movable member (for instance the tool) of a lathe; C is assumed to indicate the rotary axis of the spindle which drives in rotational motion the workpiece to be worked or to be inspected. The Z axis is the displacement axis parallel to the rotary axis C.

Figure 1:
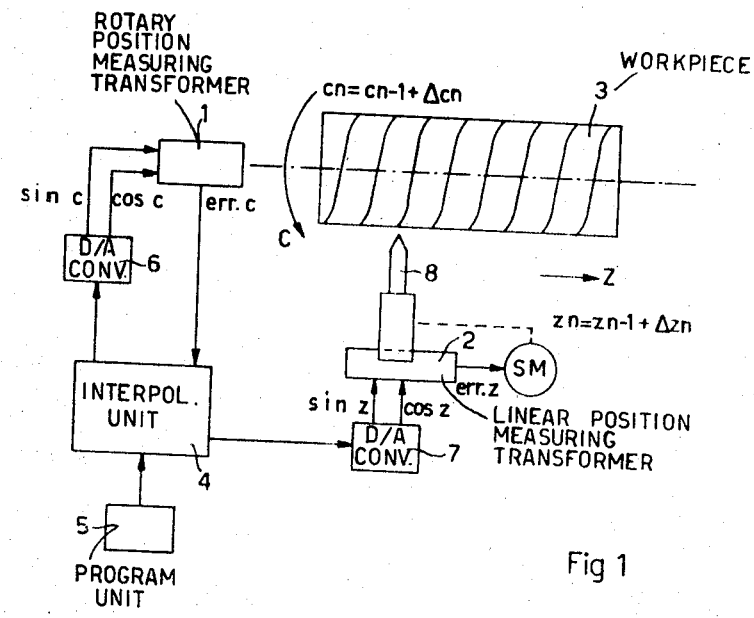
FIG. 1 represents a diagram of the control device according to the invention.

Mounted on the axis C of the spindle is a rotary position measuring transformer 1 (FIG. 1), to which are fed the signals sin $c$, cos $c$, $c$ being the rotary coordinate along the axis C. Mounted on the tool linear displacement axis Z is a linear position measuring transformer 2, to which are fed signals sin $z$, cos $z$, $z$ being the coordinate along the axis Z. The piece 3 to be worked, for instance to be threaded, is secured to the spindle of the machine-tool so that it is able to rotate around the axis C. Also the rotary position measuring transformer 1 is secured to the spindle of the machine-tool so that it rotates with the same speed.

An interpolating unit 4, analogous to the one described in the cited patent application, is fed by a program unit 5, and is adapted to supply digital position orders to digital-to-analog converters 6, 7 for the axis C and for the axis Z respectively.

If the computation of the position $c$ proceeds in the interpolation unit in exact synchronism with the rotary movement of the spindle, an error signal err $c$, which is always null, is present at the output of the rotary position measuring transformer 1 feeding said interpolating unit 4.

Therefore, in order that the tool 8 may follow a screw on the piece 3 it is necessary to maintain the synchronism of the computation of $c$ with the rotational movement and to operate in such a way that the ratio between the increments given to $c$ along the axis C and to $z$ along the axis Z is equal to the programmed pitch of said screw.

For executing a thread cut on the piece 3 it is necessary that the program unit supply the following data:

1. auxiliary function of thread indicated by AUG;
2. length of the thread in coordinates, indicated by means of the address Z followed by the sign and by seven binary digits;
3. pitch of the thread, indicated by the address K followed by five binary digits;
4. auxiliary function of rotation for the spindle indicated by AUM;
5. speed of rotation for the spindle, indicated by the address S followed by two binary digits.

If the thread to be worked is conical it will be necessary to specify in the program also the length of the thread along the In order that during each interpolating cycle the ratio between the increments of movement along the axis Z and the increments of movement along the axis C may be constant and equal to the pitch $k$ of the thread, that is with reference to the $n$th interpolation cycle $$(\Delta zn/\Delta cn) = k, \quad (1)$$

the magnitude $k/232$ mm. corresponding to the minimum speed increment along the axis Z is directly entered into a first memory register and the magnitude $1/232$ turn to corresponding to the minimum speed increment along the axis C is entered into a second memory register.

It is to be noted that the position measuring transformer 2 is cyclic and comprises a series of position zeros spaced 2 mm. apart.

Subsequently, said magnitudes are multiplied by 2, by shifting the contents of the registers toward the successive binary positions of higher order, until there is obtained the quantity $$\Delta^2 c = (1/1000)\Delta \text{turn},$$

which defines an acceleration equal to 40 t.p.s.$^2$ to the computation of $c$, as 5 ms. is the duration of an interpolating cycle.

As all increments given to $c$ and to $z$ are always multiples in the same ratio of the corresponding minimum increments, the requested ratio (1) between $\Delta cn$ and $\Delta zn$ is always maintained.

The error signal supplied by the position measuring transformer 1 is fed to error thresholds, the outputs of which will supply logical signals when a. the error is higher than $+(1/1000)$ of turn;
b. the error is higher than $-(1/1000)$ of turn;
c. the error is higher than $+(4/1000)$ of turn;
d. the error is higher than $-(4/1000)$ of turn;

where the sign $+$ or $-$ indicates that the spindle is out of phase in a positive or negative sense respectively with respect to the order supplied by the interpolation unit.

At the beginning $cn=0$. When the spindle crosses the position 0, that is when its condition changes from a negative error to a positive error, the computation of the coordinate $c$ begins.

The computations carried out on $\Delta cn$ are also carried out on $\Delta zn$, so as to have always $\dfrac{\Delta zn}{\Delta cn} = k$ though at the beginning the computation of $zn+1 = zn + \Delta zn$ is blocked, whereby during the synchronizing operations no displacement occurs along the longitudinal axis Z.

The computation proceeds in a normal way, that is with a constant acceleration, i.e. with $\Delta^2 cn$ and $\Delta^2 zn$ constant, while the spindle is already in rotation at constant speed $V_M$ as specified by the program. In this manner when $\Delta cn$ referred to an interpolating cycle becomes equal to the spindle speed, the position shown by $cn$ does not correspond to the spindle position.

Figure 2:
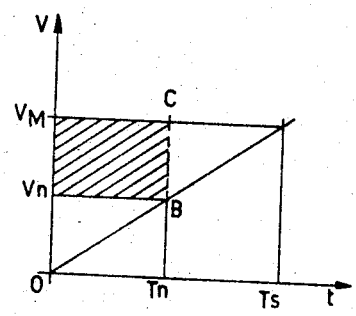
FIG. 2 represents a speed diagram referred to the device of FIG. 1.
Figure 3:
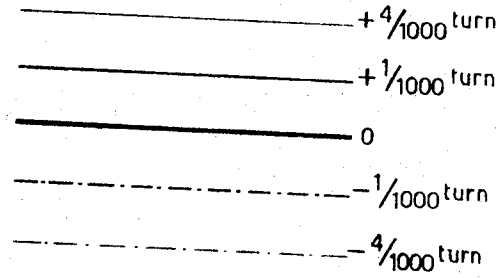
FIG. 3 represents the arrangement of the control thresholds comprised in the device of FIG. 1.

Therefore, in the first synchronization phase the magnitude $cn + \Sigma \Delta cn = 2$ $cn$ is sent from the interpolating unit 4 to the converter 6, so that the following condition is realized (FIG. 2): at the time $Tn$ the speed achieved by the computation is $Vn$, the space indicated by the computation of $cn$ is equal to the area of the triangle $OBTn$, while $cn + \Sigma \Delta cn =$ area $OTnBVn$, and the space traveled by the spindle $=$ area $OTnCV_M$.

The error is positive, because the spindle is advanced with respect to the computation.

When at the instant $Ts$ the speed reached by the computation $os$ equal to $V_z$ the space covered by the spindle is equal to the magnitude $cn + \Sigma \Delta cn$ fed to the converter, that is the error crosses again the zero (from positive to negative). At this moment the magnitude $cn + \Sigma \Delta cn$ is sent to the register of $cn$. The spindle and the computation are therefore synchronized as to speed and position, and then the speed represented by $\Delta cn$ referred to an interpolating cycle will be controlled by the error thresholds;

a. if the error on the output $err$ $c$ of the position measuring transformer 1 becomes higher than $\pm (1/1000)$ turn, i.e. equal to $\Delta^2 c$, the computation speed is changed in the interpolating unit as follows:

$$\Delta c \text{ new} = \Delta c \text{ old} \pm \Delta^2 c;$$

if the error remains higher than $\pm (1/1000)$ turn $$c(n+1) = cn + \Delta c \text{ new} \pm \Delta^2 c;$$

b. if the error is higher than $\pm (4/1000)$ turn, i.e. equal to $4\Delta^2 c$, the computation speed is changed in the interpolating unit 4 as follows:

$$\Delta c \text{ new} = \Delta c \text{ old} \pm 4\Delta^2 c;$$

if the error remains higher than $\pm (4/1000)$ turn $$c(n+1) = cn + \Delta c \text{ new} + 4\Delta^2 c.$$

When the computation crosses again the position 0 the order to start is given for the coordinate $z$, that is the computation of $zn+1 = zn + \Delta zn$ starts and also the threading begins.

As an uncertainty equal to $\Delta cn$ exists in the crossing of 0 of the computation for the spindle, the register of $cn$ is reset to zero when the start order is given to $z$.

Let $z1$ and $z2$ represent the coordinates of the beginning and the end respectively of the thread.

The first operation after the starting of $z$ will therefore be $$z1 + \Delta zn = z(n+1),$$
$$0 + \Delta cn = c(n+1),$$

so that also in the successive cuts the threads are always obtained with the same phase.

When the distance from $zn$ to $z2$ is lower than $250\mu$m. the "end" order is given, and the interpolation unit resumes the normal operation. If a further cut is to be made a return to $z1$ is programmed and then the thread function AUG is again programmed.

If the thread is conical the thread length and the transverse pitch $i$ should be programmed also for the axis X. In this case the operation is analogous to the described one: the computations executed for $z$ are repeated for $x$.

The described system operates provided that during the synchronization phase the highest error is always lower than half pitch of the rotary position measuring transformer. The maximum error occurs for $$t = Ts/2 \text{ (}Ts = \text{synchronization time).}$$

During the acceleration phase spent in synchronizing the computation speed with the spindle speed, the computation acceleration is $4\Delta^2 c = 160$ t.p.s.$^2$. Therefore, the maximum possible speed for the spindle should be $$\tfrac{1}{2} \text{ turn} = \frac{V^2}{4a} M \, (a = 40 \text{ t.p.s.}^2)$$
$$V_M = \sqrt{2a} = 8.95 \text{ t.p.s.} = 537 \text{ t.p.m.}$$

In order to allow the synchronization also with higher speeds, when the error is higher than $+(150/1000)$ turn, the value $(125/1000)$ turn is added to $cn$.

Said value may be added seven times, which are counted by a counter. When the error becomes again negative such value is subtracted and the counter jumps backwards.

The order for the end of the synchronization is given when the error becomes negative, the counter being on zero. In this way the value which may be added to the maximum error is $$7 \cdot (125/1000) \text{ turn} = (875/1000) \text{ turn}$$

In this case the maximum possible speed for the spindle is:

$$V_M{}^2/a = \tfrac{1}{2} + (875/1000); \quad V_M = 885 \text{ t.p.m.}$$

At such speed the increment is $\Delta c = (75/1000)$, and therefore it is still adapted to allow sufficient controls within the pitch of the thread so that the different errors may be discriminated.

It will be evident that many minor changes may be made in the disclosed embodiment of the invention without departure from the scope thereof. Accordingly, the invention is not to be considered limited to the disclosed embodiment, but rather only by the scope of the appended claims.

What we claim is:

1. A digital control device for positioning a movable member on an equipment, such as a machine tool, along at least one linear axis and around a rotary axis having an interpolating means for computing increments of position coordinates representing the displacement along the linear axes and around the rotary axis in successive cycles of operation and for supplying information to several mechanisms on each said linear axis causing said servomechanisms to carry out a positioning operation, comprising, program means for communicating signals to said interpolating means corresponding to the discontinuous position orders, said discontinuous position orders comprising extreme coordinates of the path segment to be traveled along each said linear axis, displacement increments along each said linear axis for each revolution of the movable member around said rotary axis and a constant rotational speed of said movable member around said rotary axis, rotary position measuring means for comparing the present position of said movable member relative to said rotary axis with a position computed by said interpolating means, said interpolating means being coupled to an input of said position measuring means so as to communicate thereto a signal corresponding to said computer position, said position measuring means supplying an output error signal corresponding to the error between said compared positions, and means coupling said output error signal to said interpolating means for controlling the computing operation thereof in a manner such that the amount of displacement increment of said movable member computed in each interpolating cycle for each of said linear axes per revolution around the rotary axis equals the corresponding programmed displacement increment.

2. A digital control device according to claim 1, wherein the programmed displacement increment is furnished by the program unit to the memory of the interpolating unit as a minimum displacement increment for a given minimum rotary increment per interpolating cycle and wherein the interpolating unit is arranged in a synchronizing phase, during which the said computed displacement for each linear axis is not incremented, to multiply the said minimum increments by the same amounts until the multiplied minimum rotary increment reaches a predetermined value, and then to accumulate rotary position increments increasing by an amount equal to said predetermined value in each interpolating cycle until the rotary displacement increment computed in each interpolating cycle corresponds to the actual programmed speed of rotation of the member rotating about the rotary axis and the double of the rotary displacement computed for the rotary coordinate is equal to the rotary displacement actually covered by said rotating member, and wherein the interpolating unit is thereafter arranged to increment the computed displacement for each said linear axis by the corresponding value attained by the displacement increment per interpolating cycle.

3. Digital position control device according to claim 1, including means providing thresholds for the error fed by the output of the rotary position measuring transformer, said interpolating means being operable upon the error exceeding one of said thresholds to modify the amount of the position increment accumulated in each interpolation cycle in order to follow the speed of said movable member about said rotary axis.

4. Digital control device according to claim 3 in which said threshold means provides at least one positive and at least one negative threshold indicating the direction and the amount of the error of the computed rotary position with respect to the proper rotational position of the movable member.

5. The method of continuously positioning a movable member of equipment, such as a machine tool, along at least one linear axis and around a rotary axis, comprising the steps of:

providing a program containing discontinuous position orders for said movable member, said discontinuous position orders including the extreme coordinates of path segments to be traveled along each said linear axis, the displacement increments along each said linear axis for each rotation of the movable member about said rotary axis, and the constant rotational speed of said movable member about said rotary axis, rotating said movable member around said rotary axis at a constant rotational speed, interpolating on the bases of said program in successive interpolation cycles to compute displacement increments for each of said linear axes such as to maintain said linear axes in synchronism with the constant rotational speed and the rotary displacement of said rotary member, and moving said member along each of the said linear axes in accordance with the linear displacement increments computed during the interpolating step conjointly with the said rotary position increments.

6. The method defined in claim 5 wherein said interpolating step is accomplished in such a manner as to compute an increment for each linear axis during a single revolution of said member which is equal to the corresponding displacement increment provided by said program.